United States Patent
Wild et al.

(10) Patent No.: US 10,248,382 B2
(45) Date of Patent: Apr. 2, 2019

(54) USER INTERFACE AND METHOD FOR ASSISTING A USER WITH THE OPERATION OF AN OPERATING UNIT

(71) Applicant: VOLKSWAGEN AKTIENGESELLSCHAFT, Wolfsburg (DE)

(72) Inventors: Holger Wild, Berlin (DE); Mark Peter Czelnik, Wolfsburg (DE); Gordon Seitz, Ehra-Lessien (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 440 days.

(21) Appl. No.: 15/025,526

(22) PCT Filed: Sep. 27, 2013

(86) PCT No.: PCT/EP2013/070214
§ 371 (c)(1),
(2) Date: Mar. 31, 2016

(87) PCT Pub. No.: WO2015/043652
PCT Pub. Date: Apr. 2, 2015

(65) Prior Publication Data
US 2016/0239261 A1  Aug. 18, 2016

(51) Int. Cl.
*G06F 3/16* (2006.01)
*B60K 35/00* (2006.01)
(Continued)

(52) U.S. Cl.
CPC .............. *G06F 3/167* (2013.01); *B60K 35/00* (2013.01); *B60K 37/06* (2013.01); *G06F 3/044* (2013.01);
(Continued)

(58) Field of Classification Search
CPC ....................................................... G06F 3/167
(Continued)

(56) References Cited

U.S. PATENT DOCUMENTS 7,257,536 B1 *  8/2007  Finley ................ G06Q 30/0603
379/101.01
8,555,171 B2 * 10/2013  Kuo ........................ G06F 3/167
709/231
(Continued)

FOREIGN PATENT DOCUMENTS

DE      102007039450 A1   2/2009
KR         20120067334     6/2012
(Continued)

OTHER PUBLICATIONS

Korean Patent Appln. No. KR-10-2016-7010261. Applicant: Volkswagen AG. Office Action (dated Feb. 13, 2017).
(Continued)

*Primary Examiner* — William D Titcomb
(74) *Attorney, Agent, or Firm* — Loza & Loza, LLP; Peter Zura

(57) ABSTRACT

User interface and process to support a user in the operation of a touch-sensitive control unit. A presence of a means of input, such as a finger of the user, is detected in a predefined first area relative to the control unit. In response to the detection, an acknowledgement may be produced via a predefined first audio output including a first sound sign, which is associated in a context-specific manner with a button displayed on the control unit.

18 Claims, 3 Drawing Sheets

(51) Int. Cl.
  *G06F 3/0488*  (2013.01)
  *G06F 3/044*  (2006.01)
  *B60K 37/06*  (2006.01)

(52) U.S. Cl.
  CPC ........ *G06F 3/0488* (2013.01); *G06F 3/04883* (2013.01); *B60K 2350/1012* (2013.01); *B60K 2350/1028* (2013.01); *B60K 2350/1032* (2013.01); *B60K 2350/1052* (2013.01); *G06F 2203/04108* (2013.01)

(58) Field of Classification Search
  USPC ........................................................ 715/727
  See application file for complete search history.

(56) References Cited

U.S. PATENT DOCUMENTS

| | | | | |
|---|---|---|---|---|
| 8,718,797 | B1* | 5/2014 | Addepalli | H04W 4/046 700/17 |
| 8,818,716 | B1* | 8/2014 | El Dokor | G01C 21/00 701/426 |
| 9,285,944 | B1* | 3/2016 | Penilla | G06Q 20/18 |
| 9,300,779 | B2* | 3/2016 | Langlois | H04M 1/6091 |
| 2006/0022955 | A1 | 2/2006 | Kennedy | |
| 2008/0129520 | A1 | 6/2008 | Lee | |
| 2009/0167701 | A1 | 7/2009 | Ronkainen | |
| 2009/0225043 | A1 | 9/2009 | Rosener | |
| 2013/0063373 | A1* | 3/2013 | Roh | G06F 17/30905 345/173 |
| 2013/0275875 | A1* | 10/2013 | Gruber | G10L 15/22 715/728 |
| 2014/0089805 | A1* | 3/2014 | Song | G06F 3/167 715/727 |
| 2014/0136213 | A1* | 5/2014 | Kim | G06F 3/167 704/275 |
| 2015/0135145 | A1* | 5/2015 | Kamide | G06F 3/0488 715/863 |

FOREIGN PATENT DOCUMENTS

| | | |
|---|---|---|
| WO | 2009/062677 A2 | 5/2009 |
| WO | 2010/131163 A1 | 11/2010 |

OTHER PUBLICATIONS

International Search Report and Written Opinion for PCT/EP13/70214 dated May 16, 2004; 12 pages.

\* cited by examiner

USER INTERFACE AND METHOD FOR ASSISTING A USER WITH THE OPERATION OF AN OPERATING UNIT

RELATED APPLICATIONS

The present application claims priority to International Pat. App. No. PCT/EP2013/070217, titled "User Interface and Method for Assisting a User When Operating an Operating Unit," to Wild et al, filed Sep. 27, 2013, the contents of which is incorporated by reference in its entirety herein.

BACKGROUND

The present disclosure relates to a user interface and a process to support a user in the operation of a touch-sensitive control unit. In particular, the present disclosure relates to the support of a driver of a means of locomotion in the operation of a control unit, arranged in a fixed manner in the means of locomotion, while exercising the task of driving.

The prior art discloses vehicles equipped with human-machine-interfaces (HMI) whose screens can display elective contents and interaction areas. Likewise, turn/push regulators, pushbuttons and other mechanical elements are also known for operation, such as touch-sensitive surfaces, comprising capacitive sensors, for example. In addition, systems are known in which a user gesture made in front of a screen is detected, without contact with the control unit being required. Such an operating step is called "hovering". Here the gestures are detected through optical sensors (cameras) and alternatively or additionally through capacitive sensor technology, and are associated with a predetermined button. In this connection, reference is made to the operating system "Windows 8"™ and to the "Air View"™ of the Samsung Galaxy S4™.

WO 2009/062677 A2 shows a multimode user interface of an infotainment system for inputting and presenting information, in which gestures combined with voice commands are used to call up predefined functions. Here capacitive sensors are used to detect touch/gestures, and a voice recognition system is used to detect voice commands.

There is a need in the art to support a user in the operation of a user interface, especially while he is exercising the task of driving.

BRIEF SUMMARY

In certain illustrative embodiments processes are disclosed for supporting a user in the operation of a touch-sensitive control unit comprising the steps of detecting a presence of a means of input, such as a finger of the user, in a predefined first area relative to the control unit, and in response to this, acknowledging of the detected presence by a predefined first audio output comprising a first sound sign, which is associated in a context-specific manner with a first button displayed on the control unit.

In certain illustrative embodiments, a user interface, such as a human-machine-interface installed in a fixed manner in a motor vehicle, is disclosed, that includes a motor vehicle, comprising a touch-sensitive control unit; a detection device for detection of a user input; and a processing device; wherein the user interface is set up to execute processes disclosed herein.

BRIEF DESCRIPTION OF THE DRAWINGS

Exemplary embodiments of the invention are according to detail below in reference to the accompanying drawings. The drawings are as follows.

DETAILED DESCRIPTION

Figure 1:
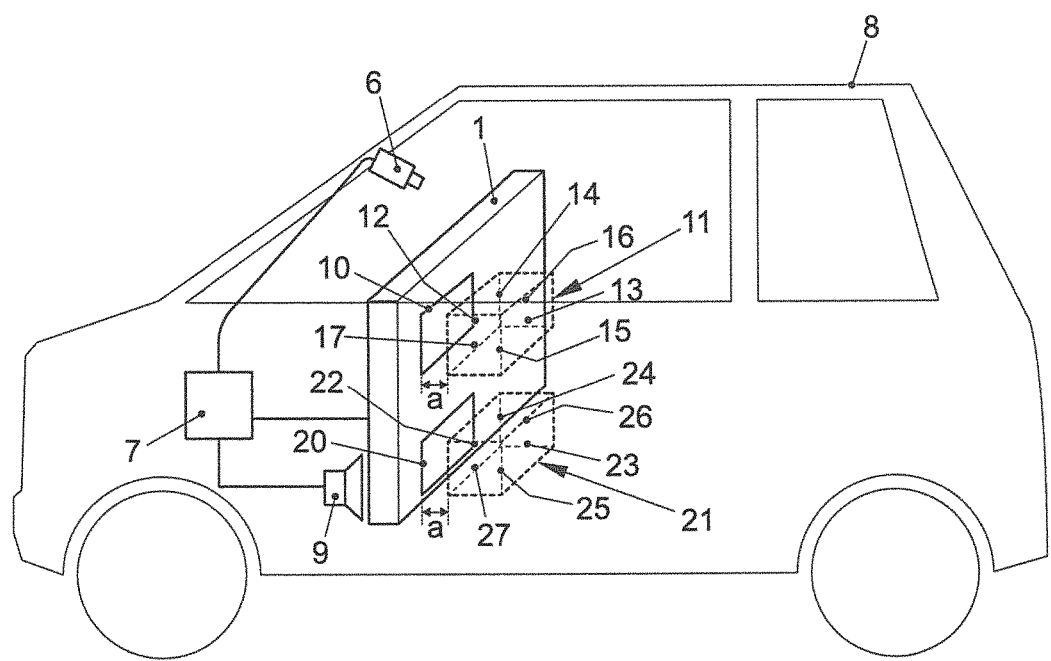
FIG. 1 is a schematic overall view of the components of a user interface according to an illustrative embodiment.

In various embodiments disclosed herein, systems, apparatuses and methods are disclosed for supporting a user in the operation of a touch-sensitive control unit, which can be in the form of an HMI installed in a means of locomotion. First, the presence of a means of input is detected in a predefined first area relative to the control unit. The means of input can be, for example, a stylus, a finger of a user, another part of the user's body, or something similar. According to the previously mentioned touch/gesture detection, the predefined first area can be in contact with the control unit ("touch operation") and extend in a predefined range of distances in front of the control unit ("hover area"). To detect the different inputs, the control unit can comprise capacitive sensors, camera-based sensor technology, or something similar. In response to detecting the presence of the means of input, an audio output is generated, by means of which the presence is acknowledged to the user. The audio output comprises a first sound sign that is associated, in a context-specific manner, with a first button shown on the control unit. The first button can represent, for example, a predefined range of functions, symbolized in a suitable manner by the first sound sign. In doing so, the first sound sign can also be understood as an "acoustic icon" (also called an "earcon"). In other words, the function associated with the button determines the form of the sound sign in such a way that when the user hears the sound sign, the user associates a certain function of a plurality of functions as the most obvious. This allows the reaching of the first predefined area to cause an acoustic notification of the function associated with the first button. When the button is pressed (e.g., by a touch input, a hover gesture, or something similar), a function associated with the button is executed, which is, according to the present disclosure, already recognized by the user due to the audio output. Accordingly, leaving the predefined first area can also be accompanied by the same sound sign, or an alternative one, in the framework of an audio output. In this way, the present invention supports the user in the operation of the control unit according to the invention, in particular when exercising the task of driving, during which the driver can devote limited attention to operating the control unit.

In certain illustrative embodiments, various processes according to the present disclosure may include detection of a presence of a means of input in a predefined second area relative to the control unit. While the second area may have similar functionality as the first area, the second area may not necessarily coincide with the first area. In response to the detected presence of the means of input in the predefined second area, the process is acknowledged to the user by a predefined second audio output. This audio output may include a second sound sign, which is associated, in a context-specific manner, with a second button shown on the control unit. In doing so, the second button may represent another function than the first button, and what was said above correspondingly applies to the second sound sign in connection with the second button. Since the second sound sign and the first sound sign clearly differ from one another, the user can, on hearing the sound sign, infer a function associated with the second button and essentially exclude execution of the function associated with the first button. This improves the support of the user in operating the user interface according to the invention when exercising the task of driving.

The predefined first area and the predefined second area can be delimited by a boundary lying essentially parallel to the surface of the control unit, which is separated from the surface of the control unit in a perpendicular direction. A first parallel boundary can be defined by the surface of the control unit itself, or a hover area can be defined by an area between the surface of the control unit and the first boundary. Perpendicular boundaries of the first or second area can coincide, for example, with the borders of a respective button that is displayed. In other words, the button displayed can be delimited by the border of a perpendicular projection of the first or second area onto the surface of the control unit. The first or second area can be separated from the surface of the control unit by a distance of −1 mm to +3 mm. Here, a negative distance range represents a touch operation, while a positive distance range stands for a hover area (i.e., no physical contact with the screen). A hover area may extend up to a distance of 10 mm to 15 cm from the surface of the control unit.

In certain illustrative embodiments, the means of input crossing from the first area into a predefined third area relative to the control unit may be detected. The features and functions described herein relative to the first and second areas also apply to the third area as well. The crossing in this example is acknowledged by a predefined third audio output including a third sound sign that is associated in a context-specific manner with a third button displayed on the control unit. In other words, the third button represents a third function that is symbolized for the user by the third sound sign. This can give the user acoustic support in the operation of the user interface according to the invention while exercising the task of driving, so that his attention can remain essentially on the traffic.

In order to increase user acceptance of the process or the user interface, and not disturb the user or other persons in the environment unnecessarily, it may be advantageous not to integrate any voice signals into the audio output or sound sign. Experience has shown that users accept repeatedly played back sounds clearly better than is the case for voice signal components. Accordingly, the audio outputs can comprise a sample or multiple samples that are related with one another, which can be varied, for example, especially when repeatedly output. A typical example is a click sound, the frequency of which can be changed depending on the operating step that is performed. For example, when a hover area is reached, a click sound of a first, higher frequency can be played back, while if there is a change from a first hover area to a second hover area a click sound of a second, lower frequency is played back. The click sounds are an example of a weakly context-sensitive association between the button and the sound sign. For example, acknowledgement of a weather-related button can be more individualized by using the sound of thunder, rain, or wind as a sound sign. This also allows a current weather situation to be conveyed, if it can be appropriately symbolized with one of the sounds. Another example is the notification of a telephone function by playing back a sequence of DTMF tones (touch tones) or a dial tone as a sound sign. A corresponding notification of a navigation function can be provided by a SONAR sound.

The associations mentioned above represent especially intuitively recognizable relationships for user's orientation.

In certain illustrative embodiments, acknowledgement of the recognized presence may be executed by a predefined visual display of a button displayed on the control unit. This makes it possible for an increased noise level to be partly compensated by the alternative visual display drawing the user's attention to the control unit and allowing an audio output that is only weakly perceived over the noise level to be recognized more easily.

It is preferable for the associations between the respective audio output and a respective button to be user-definable. This can be done, for example by allowing the user to assign respective sound signs in a configuration menu to an entire list of buttons. In addition, it can be possible and advantageous for a user to be allowed to add an additional sound sign (e.g., created by the user, or purchased from a vendor) to a sound sign database and to associate it with one of the buttons. This increases the recognition of the range of functions when the user hears the sound sign.

In certain illustrative embodiments, a user interface is disclosed that may be installed in a fixed manner in a motor vehicle. Such user interfaces are also known as human-machine-interfaces (HMI). The motor vehicle can be, for example, an on-road vehicle (passenger vehicle, truck), which can be powered electrically or through an internal combustion engine, or it can be a hybrid. The user interface includes a touch-sensitive control unit, a detection device to detect a user input, and a processing device. The touch-sensitive control unit can comprise, for example, a display, which forms, together with a touch-sensitive element, a touch screen. The detection device can comprise the touch-sensitive element and a camera system to detect hover gestures. The processing device can comprise a processor, which is arranged within the HMI and is set up, for example, to process navigation commands.

The control unit can preferably be built in to the center of the dashboard of a motor vehicle, or it can be an instrument cluster arranged behind the steering assembly of the vehicle. Alternatively, or additionally, the detection device can comprise a camera system and/or a capacitive sensor to detect hover gestures and touch gestures, and to allow them to be assigned. Furthermore, the user interface can comprise means of storage that store reference signals representing predefined gestures. The references can be read out by the processing device and compared with inputs detected by the detection device. This increases the variety of usable operating steps, so that on average fewer successive operating steps need to be executed.

According to a third aspect of the present invention a vehicle is proposed that comprises a user interface according to the second-mentioned aspect of the invention. The user interface can be arranged within the vehicle in the form of a compact unit or in the form of a distributed system. This allows existing hardware to be used, which allows the present invention to be implemented essentially in the form of software. The features, combinations of features, and the advantages resulting from them correspond in an obvious way to those according to connection with the first-mentioned and second-mentioned aspects of the invention, so that to avoid repetition reference is made to the above discussion, as well.

FIG. 1 shows a means of locomotion 8, in which a screen of an HMI is recessed into the dashboard as control unit 1. A camera 6, in addition to proximity detection technology (not shown) through a light barrier and capacitive technologies, is provided in the area of the windshield as a detection device. The camera 6 is connected by data technology with an electronic controller 7 in the form of a processing device. The electronic controller 7 is further connected with a speaker 9 to produce an audio output, and with the control unit 1, the screen of which displays a first button 10 and a second button 20. The buttons 10, 20 may have respective cuboid areas 11, 21, outlined in the drawing with dashed lines, in which a presence of a means of input in the form of a touch input or hovering (depending on a respective distance a to the surface of the control unit 1) is detected. The areas 11, 21 may be defined by a first face (12 or 22) oriented parallel to the surface of the control unit 1, a second face (13 or 23) oriented parallel to the surface of the control unit 1 and spaced a distance from its surface, and by four faces 14 or 24, 15 or 25, 16 or 26, and 17 or 27 oriented perpendicular to the surface of the control unit 1, so that the buttons 10, 20 represent perpendicular projections of the areas 11, 21 onto the control unit 1.

Figure 2:
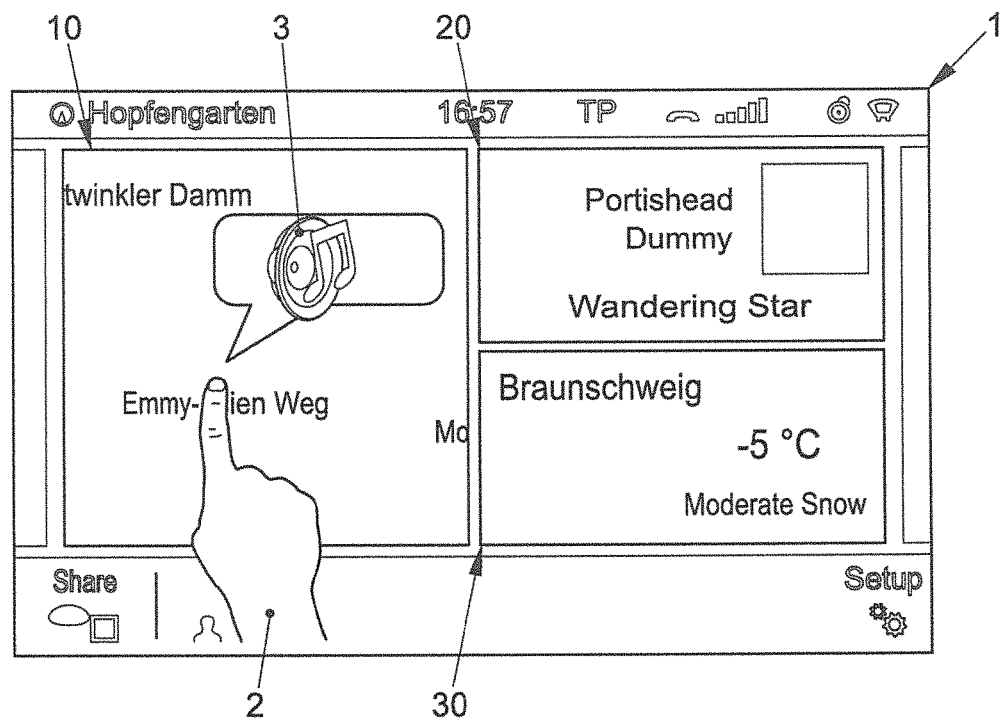
FIG. 2 is a representation of an operation process of a user interface according to an illustrative embodiment.

FIG. 2 shows an operator interface that may be displayed on the control unit 1. A first button 10 shows a section of a map, which corresponds with a part of a route calculated by a navigation system. A top area on the right side of the screen displays a second button 20 that shows the song currently playing, the artist, and the album from which the song was taken. Beneath the second button 20 there is a third button 30, which shows the weather in the German city Braunschweig, in the form of an icon along with the temperature in degrees Celsius and the current precipitation. The hand of a user 2 is located in front of the first button 10. A first predefined output 3 comprising a SONAR signal that serves as an earcon acknowledges the presence of the hand, and in the process orients the user that he is operating a button 10 associated with a navigation function.

Figure 3:
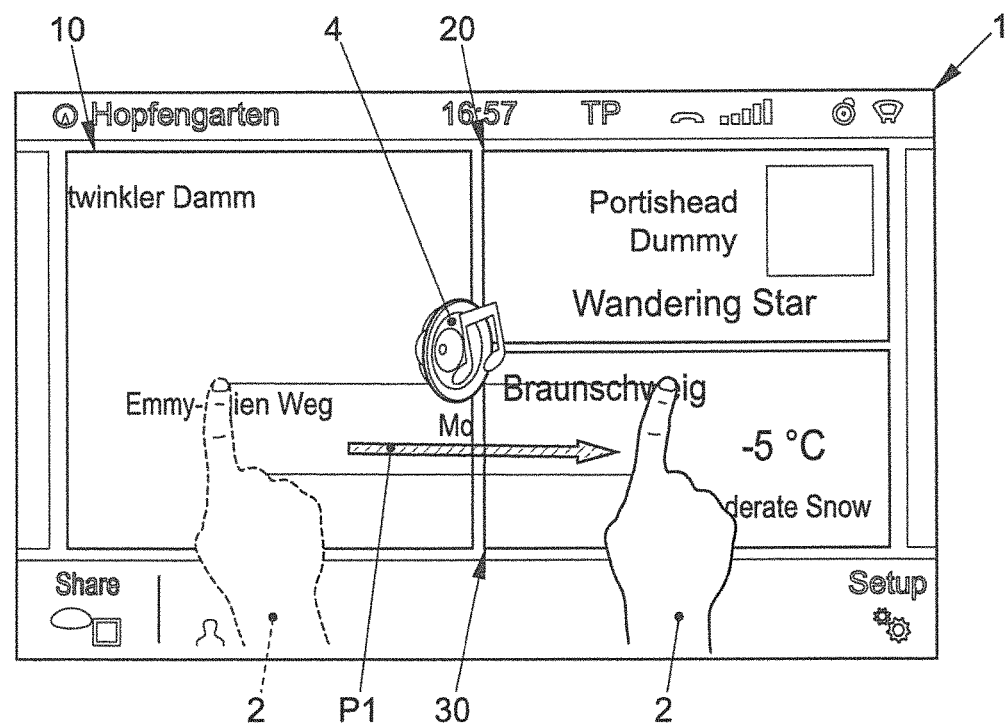
FIG. 3 is a representation of an alternative operation process of a user interface according to an illustrative embodiment.

FIG. 3 shows the view shown in connection with FIG. 2, in which the user 2 is making an alternative gesture with his hand. In this example, the user is moving his hand along an arrow P, from a first area 11 in front of the first button 10 into a third area in front of the third button 30. The detected move is acknowledged by a predefined second audio output 4, which comprises a subtle high-frequency clinking. Thus, the second audio output 4 corresponds with the contents of the third button by playing back an audio file that symbolizes the snowfall, which is also announced in text form. For example, a high-frequency soft chime can also evoke a corresponding association in the user 2. However, at least the user is informed that the button 30 is associated with a weather-related function, without him having to glance at the control unit.

Figure 4:
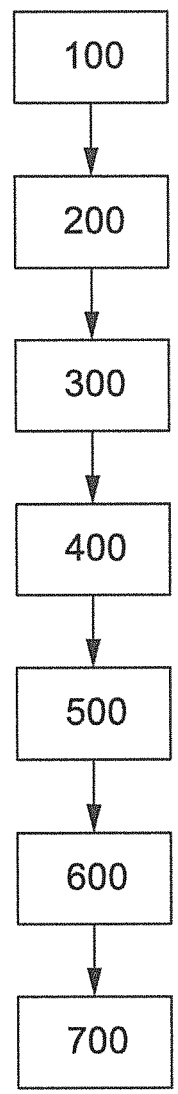
FIG. 4 is a flow chart illustrating a process according to an illustrative embodiment.

FIG. 4 shows a flow chart illustrating the steps of an exemplary embodiment of a process according to the invention. The process begins in step 100 with the user assigning a first sound sign to a first button that can be displayed on the control unit. This can be done in aa configuration menu of a user interface according to the invention. In doing so, individual buttons, or all the buttons of the operating system of the user interface can be supplemented by sound signs selected from a predefined (although expandable) database of sound signs. After the assignment has been made, in step 200 the presence of a means of input (e.g., in the form of touch or hover gestures) in a predefined first area relative to the control unit is detected. In response to this, in step 300 the presence is acknowledged to the user by a predefined first audio output comprising a first sound sign, which is associated in a context-specific manner with a first button displayed on the control unit. A function associated with the first button corresponds to a procedure that the user associates with the first sound sign in a simple way. Further, in step 400 the presence of the means of input in a predefined second (different) area relative to the control unit (e.g., on or over a second button) is detected and in response to this in step 500 the detected presence is acknowledged to the user by a predefined second (different) audio output. This second audio output may include a second sound sign that represents an acoustic symbol for a function associated with the second button. Then, in step 600, the means of input moves from a first area into a predefined third (once again different) area relative to the control unit. In response to this, in step 700 the movement is acknowledged to the user by a predefined third audio output comprising a third sound sign that is associated in a context-specific manner with a third button displayed on the control unit. In other words, the third button stands for a third (and different) function that is acoustically symbolized for the user by the third sound sign.

Although the aspects according to the invention and advantageous embodiments have been described in detail on the basis of the exemplary embodiments explained in connection with the attached drawing figures, modifications and combinations of features of the exemplary embodiments shown are possible for the person skilled in the art, without leaving the scope of this invention, the scope of protection of which is defined by the attached claims.

LIST OF REFERENCE NUMERALS

1 Control unit
2 Means of input of a user
3, 4, 5 Audio outputs
6 Camera
7 Electronic controller
8 Vehicle
9 Speaker
10 Button
11 First area
12, 13, 14, 15, 16, 17 Boundaries of area
20 Button
21 Second area
22, 23, 24, 25, 26, 27 Boundaries of area
100, 200, 300, 400, 500, 600 Process steps
P Gestures
a Distance

The invention claimed is:
1. A method of operating a touch-sensitive operator control unit for a vehicle, comprising:
 displaying a graphical symbol on the operator control unit;
 detecting the presence of input means in a predefined first area in front of the operator control unit in an area of the displayed graphical symbol, wherein the predefined first area comprises an area parallel above a surface of the operator control unit; and
 generating a predefined first audio output comprising a context-specific sound associated with a vehicle function of the graphical display symbol in response to the detected presence of the input means; and
 detecting direct contact of the input means with the displayed graphical symbol to cause execution of the vehicle function; and
 generating another predefined audio output comprising a context-specific sound associated with the vehicle function of the graphical display symbol in response to the detected direct contact with the displayed graphical symbol.

2. The method of claim 1, further comprising:
displaying a second graphical symbol on the operator control unit;
detecting the presence of input means in a predefined second area in front of the operator control unit in an area of the displayed second graphical symbol, wherein the predefined second area comprises an area parallel to a surface of the operator control unit; and
generating a predefined second audio output comprising a second context-specific sound associated with the second graphical display symbol in response to the detected presence of the input means.

3. The method of claim 1, wherein the predefined first area comprises a distance of 10 mm to 15 cm and the predefined second area comprises a distance of −1 mm to +100 mm from the surface of the control unit.

4. The method of claim 1, wherein the predefined first area comprises a distance of 10 mm to 15 cm and the predefined second area comprises a distance of −1 mm to +30 mm, from the surface of the control unit.

5. The method of claim 1, further comprising:
displaying another graphical symbol on the operator control unit;
detecting a movement of the input means from the predefined first area to another predefined area relative to the control unit; and
generating another predefined audio output comprising a context-specific sound associated with the another graphical symbol in response to the detected movement of the input means.

6. The method of claim 1, wherein the predefined first audio output comprises at least one of:
a click sound of a first frequency;
a click sound of a second frequency lower than the first frequency;
a sound of thunder;
a sound of rain;
a sound of wind;
a sequence of DTMF tones;
a dial tone;
a SONAR sound.

7. The method of claim 1, further comprising generating another graphical symbol on the operator control unit in response to the detected presence of the input means.

8. The method of claim 1, wherein the predefined first audio output associated with the graphical display symbol is assigned by a user.

9. A Human Machine Interface installed in a motor vehicle, comprising:
a touch-sensitive operator control unit configured to display a graphical symbol on the operator control unit;
a detection device configured to
detect the presence of input means in a predefined first area in front of the operator control unit in an area of the displayed graphical symbol, wherein the predefined first area comprises an area parallel above a surface of the operator control unit,
detect direct contact of the input means with the displayed graphical symbol to cause execution of the vehicle function; and
a processing device, operatively coupled to the detection device and the operator control unit, wherein the processing device is configured to
generate a predefined first audio output comprising a context-specific sound associated with a vehicle function of the graphical display symbol in response to the detected presence of the input means, and
generate another predefined audio output comprising a context-specific sound associated with the vehicle function of the graphical display symbol in response to the detected direct contact with the displayed graphical symbol.

10. The Human Machine Interface of claim 9, wherein the operator control unit is built in to the center of a dashboard of the motor vehicle.

11. The Human Machine Interface of claim 9, wherein the detection device comprises a camera system and/or a capacitive sensor.

12. The Human Machine Interface of claim 9, wherein
the touch-sensitive operator control unit is further configured to display a second graphical symbol on the operator control unit;
the detection device is configured to detect the presence of input means in a predefined second area in front of the operator control unit in an area of the displayed second graphical symbol, wherein the predefined second area comprises an area parallel to a surface of the operator control unit; and
the processing device is configured to generate a predefined second audio output comprising a second context-specific sound associated with the second graphical display symbol in response to the detected presence of the input means.

13. The Human Machine Interface of claim 9, wherein the predefined first area comprises a distance of 10 mm to 15 cm and the predefined second area comprises a distance of −1 mm to +100 mm from the surface of the control unit.

14. The Human Machine Interface of claim 9, wherein the predefined first area comprises a distance of 10 mm to 15 cm and the predefined second area comprises a distance of −1 mm to +30 mm from the surface of the control unit.

15. The Human Machine Interface of claim 9, wherein
the touch-sensitive operator control unit is further configured to display another graphical symbol on the operator control unit;
the detection device is configured to detect a movement of the input means from the predefined first area to another predefined area relative to the control unit; and
the processing device is configured to generate another predefined audio output comprising a context-specific sound associated with the another graphical symbol in response to the detected movement of the input means.

16. The Human Machine Interface of claim 9, wherein the predefined first audio output comprises at least one of:
a click sound of a first frequency;
a click sound of a second frequency lower than the first frequency;
a sound of thunder;
a sound of rain;
a sound of wind;
a sequence of DTMF tones;
a dial tone;
a SONAR sound.

17. The Human Machine Interface of claim 9, wherein the processing device is further configured to generate another graphical symbol on the operator control unit in response to the detected presence of the input means.

18. The Human Machine Interface of claim 9, wherein the predefined first audio output associated with the graphical display symbol is assigned by a user.

* * * * *